United States Patent
Ewbank et al.

(10) Patent No.: US 6,548,969 B2
(45) Date of Patent: Apr. 15, 2003

(54) REDUNDANT STEER-BY-WIRE SYSTEM

(75) Inventors: Stephen E. Ewbank, Kokomo, IN (US); Craig A Hennings, El Paso, TX (US); Scott A. Millsap, Saginaw, MI (US); Kevin Michael Deasy, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/752,091

(22) Filed: Dec. 29, 2000

(65) Prior Publication Data

US 2002/0084757 A1 Jul. 4, 2002

(51) Int. Cl.⁷ .................................................. H02P 7/68
(52) U.S. Cl. .................. 318/34; 318/139; 180/402; 180/403; 180/406; 180/446; 701/45; 701/46; 701/48; 701/49
(58) Field of Search .............. 318/34, 139; 180/402, 180/403, 406, 446; 701/45, 46, 48, 49

(56) References Cited

U.S. PATENT DOCUMENTS

| | | | |
|---|---|---|---|
| 4,860,844 A | 8/1989 | O'Neil | 180/79.1 |
| 5,228,757 A | 7/1993 | Ito et al. | 303/100 |
| 5,251,135 A | 10/1993 | Serizawa et al. | 364/424.05 |
| 5,347,458 A * | 9/1994 | Serizawa et al. | 364/424.05 |
| 5,374,877 A * | 12/1994 | Imaseki et al. | 318/34 |
| 5,473,225 A * | 12/1995 | Miyazaki et al. | 318/52 |
| 5,576,957 A | 11/1996 | Asanuma et al. | 364/424.05 |
| 5,653,304 A | 8/1997 | Renfroe | 180/402 |
| 5,668,722 A | 9/1997 | Kaufmann et al. | 701/41 |
| 5,740,040 A | 4/1998 | Kifuku et al. | 364/424.05 |
| 5,828,972 A * | 10/1998 | Asanuma et al. | 701/41 |
| 5,829,547 A | 11/1998 | Fujii et al. | 180/422 |
| 5,835,873 A * | 11/1998 | Darby et al. | 701/45 |
| 5,925,083 A | 7/1999 | Ackermann | 701/41 |
| 6,018,691 A | 1/2000 | Yamamoto et al. | 701/41 |
| 6,097,286 A | 8/2000 | Discenzo | 340/465 |
| 6,098,296 A | 8/2000 | Perisho, Jr. et al. | 33/203 |
| 6,102,151 A | 8/2000 | Shimizu et al. | 180/446 |
| 6,152,254 A | 11/2000 | Phillips | 180/422 |
| 6,176,341 B1 * | 1/2001 | Ansari | 180/402 |
| 6,179,394 B1 | 1/2001 | Browalski et al. | 303/146 |

(List continued on next page.)

6,349,996 B1 * 2/2002 Heckmann et al. .... 303/122.04

FOREIGN PATENT DOCUMENTS

| | | | | |
|---|---|---|---|---|
| EP | 0278366 B1 | 2/1988 | | B62D/6/00 |
| EP | 0858408 B1 | 10/1996 | | B62D/5/06 |
| EP | 0985591 A2 | 8/1999 | | B62D/5/06 |
| GB | 2341588 A | 2/2000 | | B62D/5/32 |
| JP | 60259570 | 12/1985 | | B62D/7/14 |
| JP | 1115778 | 5/1989 | | |
| JP | 8034353 | 2/1996 | | B62D/1/12 |
| WO | 00/34106 | 6/2000 | | B62D/1/006 |

OTHER PUBLICATIONS

J.Y. Wong, Ph.D., "Chapter Five: Handling Characteristics of Road Vehicles," *Theory of Ground Vehicles*, 1978, pp. 210–214.

Primary Examiner—Robert E. Nappi
Assistant Examiner—Tyrone Smith
(74) Attorney, Agent, or Firm—Edmund P. Anderson

(57) ABSTRACT

An automotive steer-by-wire system is disclosed that includes a first network. The first network connects a first set of controllers for controlling a first set of motors. The steer-by-wire system further includes a second network that is independent of the first network and connects a second set of controllers for controlling a second set of motors. The steer-by-wire system includes a third network that connects the first set of controllers and the second set of controllers for controlling the first or second set of motors if the first or second network is inoperative, whereby information is transmitted via the third network independent of the first network and the second network.

31 Claims, 3 Drawing Sheets

U.S. PATENT DOCUMENTS

| | | | |
|---|---|---|---|
| 6,208,923 B1 | 3/2001 | Hommel | 701/42 |
| 6,279,674 B1 * | 8/2001 | Lissel et al. | 180/402 |
| 6,279,675 B1 * | 8/2001 | Bohner et al. | 180/403 |
| 6,283,243 B1 * | 9/2001 | Bohner et al. | 180/406 |
| 6,285,936 B1 * | 9/2001 | Bohner et al. | 701/41 |
| 6,298,940 B1 * | 10/2001 | Bohner et al. | 180/403 |

* cited by examiner

REDUNDANT STEER-BY-WIRE SYSTEM

TECHNICAL FIELD

This invention relates to automotive steer-by-wire systems, and more particularly, to such steer-by-wire systems with built-in redundancy.

BACKGROUND OF THE INVENTION

Conventional automotive steering systems typically utilize hydraulic or electric systems to effect steering of a set of road wheels. However, vehicle design is constrained by such conventional steering systems because of the need to mount a rack and pinion gear laterally within the vehicle near the engine and transmission. Also constraining vehicle design is the need to connect the steering column in the passenger compartment to the steering gear on the underside of the vehicle. This is typically accomplished with an intermediate shaft and universal joints. The distances, alignment and angles between these components are critical and limit the placement of these components. Automotive steer-by-wire systems eliminate the mechanical connections between the steering wheel and the road wheels. However, typically the requirements of the steer-by-wire system as a whole, as well as that of the subsystems thereof, are more demanding than in conventional steering systems. In the event that one part of the steer-by-wire system becomes inoperative, it is desirable that redundancy is part of the steer-by-wire system so that continued operation of the vehicle may still be had.

BRIEF SUMMARY OF THE INVENTION

An automotive steer-by-wire system is disclosed that includes a first network. The first network connects a first set of controllers for controlling a first set of motors. The steer-by-wire system further includes a second network that is independent of the first network and connects a second set of controllers for controlling a second set of motors. The steer-by-wire system includes a third network that connects the first set of controllers and the second set of controllers for controlling the first or second set of motors if the first or second network is inoperative, whereby information is transmitted via the third network independent of the first network and the second network.

DETAILED DESCRIPTION OF THE INVENTION

Figure 1:
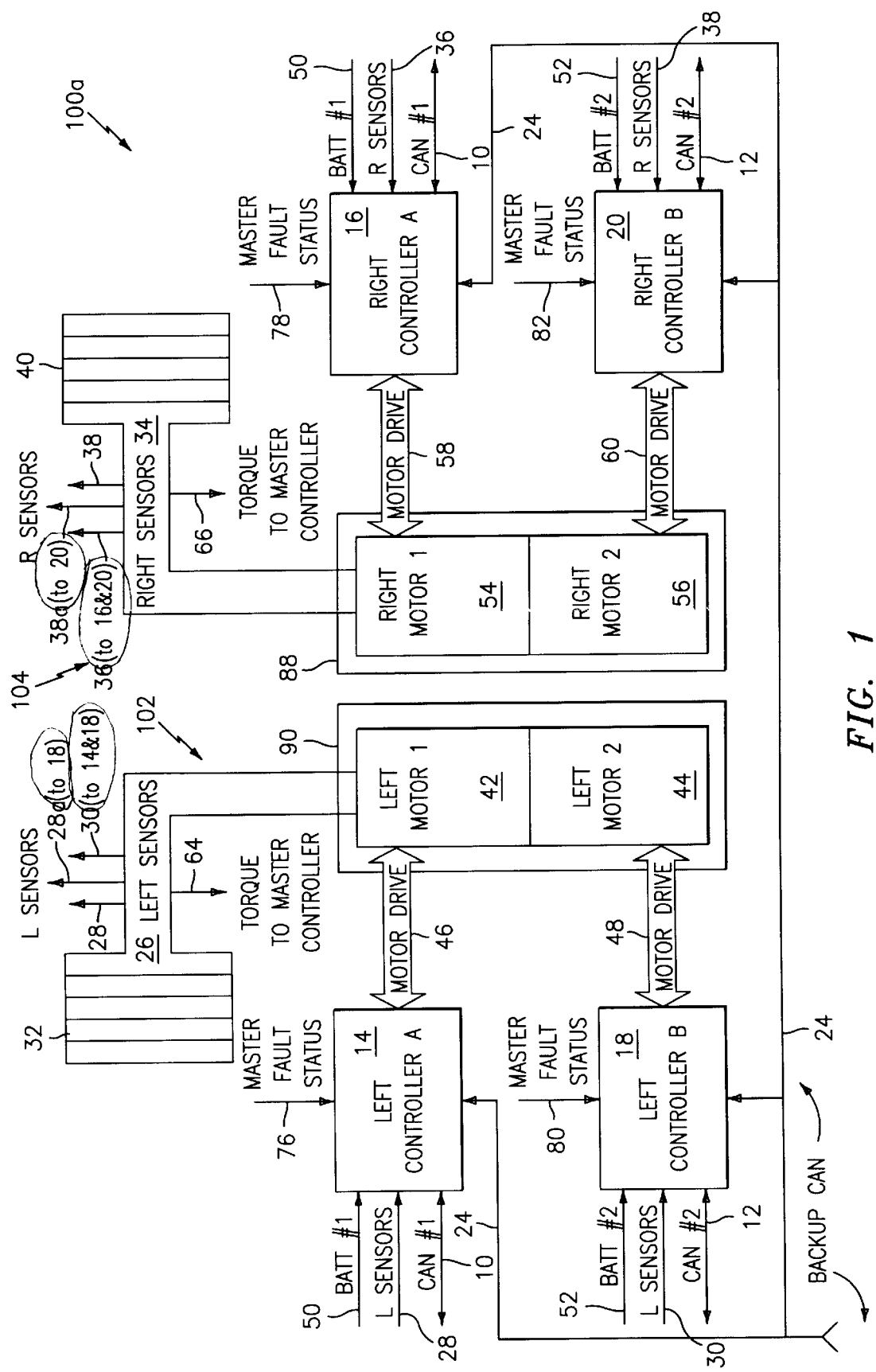
FIG. 1 is a schematic block diagram of a first segment of an automotive steer-by-wire system.
Figure 2:
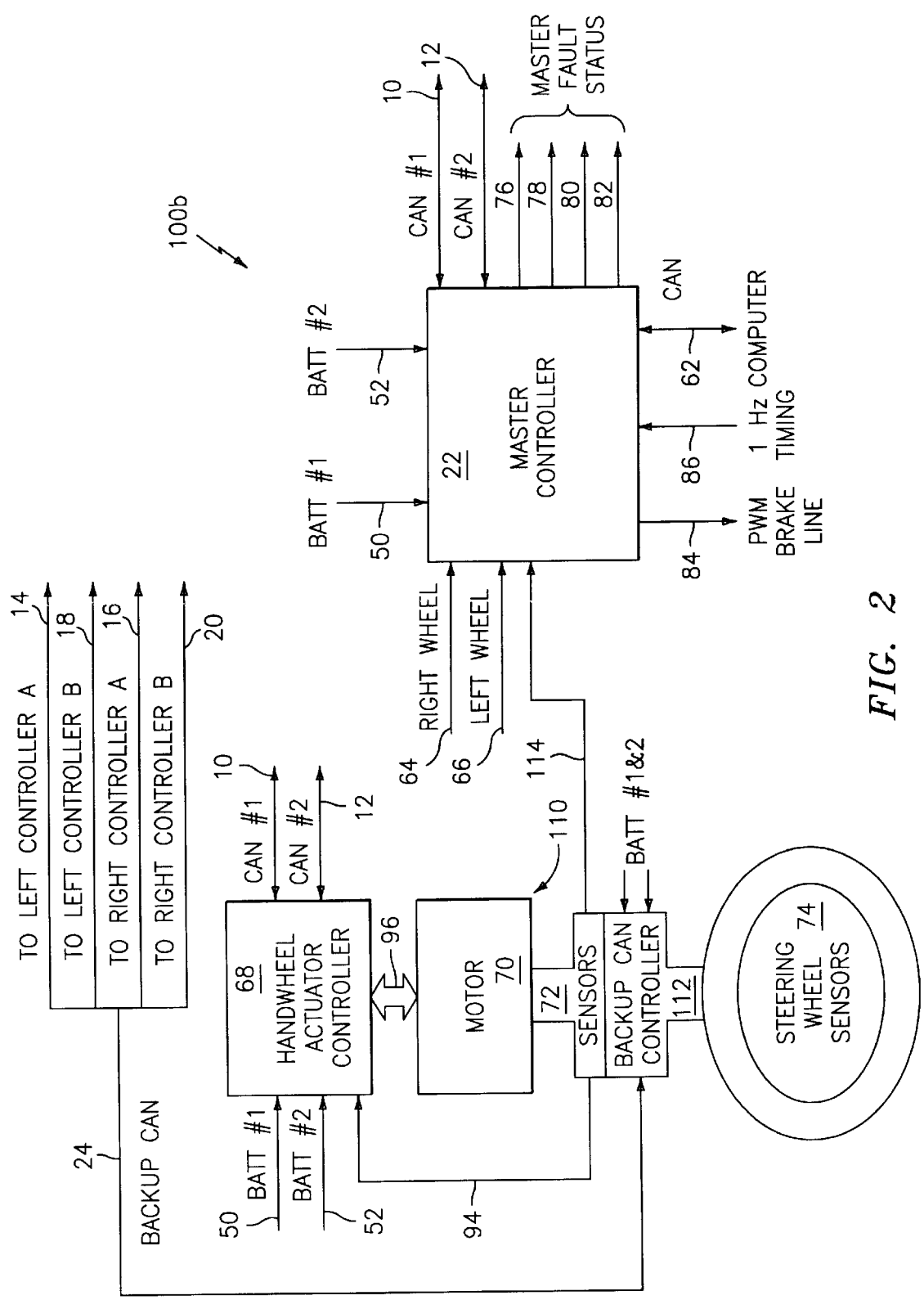
FIG. 2 is a schematic block diagram of a continuation of the first segment of an automotive steer-by-wire system of FIG. 1.

In FIG. 1, a first segment of an automotive steer-by-wire system is shown generally at 100a. In FIG. 2, a continuation of the first segment of an automotive steer-by-wire system 100a of FIG. 1 is shown generally at 100b. In FIGS. 1 and 2, the automotive steer-by-wire system 100a, 100b described herein utilizes four electric motors 42, 44, 54, 56 to drive two steering gear systems shown generally at 102 and 104. Two electric motors are assigned to each steering gear system 102, 104. The motion of the two steering gear systems 102, 104, i.e., a left and right steering gear system, which are coupled to tie rods 104, 106 (FIG. 3) and to left and right road wheels 32, 40, is independently controlled by a set of electronic controllers 14, 18, 16, 20. One controller is designated for each motor wiring. Each of these controllers 14, 18, 16, 20 is referred to as a local controller. Two motors drive each steering gear system 102, 104 for redundancy. It will be appreciated that this redundancy allows for the possibility that no mechanical linkage exists between the left and right steering gear systems 102, 104. A left set of sensors 26 comprising two absolute position sensors at 28, 28a, and a high resolution position sensor 30 and a right set of sensors comprising two absolute position sensors at 38, 38a and a high-resolution position sensor at 36, are used per steering gear assembly 102, 104 to measure the position of the road wheels 32, 40 and the forces generated by or on each respective roadwheel/steering gear system 102, 104.

In addition, the steer-by-wire system 100a, 100b of FIGS. 1 and 2 utilizes a motor/controller 68, 96, 70 in a steering assembly 110 to generate and regulate torque feedback to the driver to simulate road forces normally felt at the steering wheel in a vehicle equipped with a conventional steering system. The steering assembly 110 comprises a handwheel actuator controller 68 coupled to a torque motor 70 by motor drive 96, steering wheel sensors 72 coupled to the torque motor 70, a backup CAN controller 112 connected to the backup control area network (CAN) 24 and a steering wheel 74. The steering assembly 110 is independent of the other motor/controller assemblies. Steering wheel sensors 72 provide steering wheel position and torque signals 94 to the handwheel actuator controller 68 and steering wheel position signal 114 to the master controller 22.

A master controller 22 is utilized to coordinate and control the operation of the above described controllers 14, 18, 16, 20, 68. In addition, the master controller 22 generates a torque feedback command on CAN1 10 and CAN2 12 to the steering assembly 110 and displays information to a vehicle operator through status lamps. Also, the master controller 22 is in communication with other electronic controllers (not shown). For example, the master controller 22 may be in communication with a brake controller (not shown) in order to bring a vehicle equipped with the steer-by-wire system 100a, 100b to a stop if the steer-by-wire system 100a, 100b is inoperative. The master controller 22 may also generate automatic steering commands for automatic driving, as well as providing a signal to the local controllers 14, 18, 16, 20 indicating the status of the master controller 22.

The above mentioned five controllers 14, 18, 16, 20, 68 communicate with each other via three networks. The three networks use a network protocol, such as a Controller Area Network (CAN) protocol to govern the format and timing of the exchange of data between the elements of the steer-by-wire system 100a, 100b. In the preferred embodiment, the three networks are CAN1 10, CAN2 12, and backup CAN 24. The network transmission media may be fiber optic cable or copper wires or other suitable transmission media.

The backup CAN 24 includes a backup CAN controller 112. The backup CAN controller 112 reads sensed steering wheel position and transmits this information via the backup CAN 24 to the local controllers 14, 18, 16, 20 in order to allow for proper steering and control if the normal operation of the steer-by-wire system 100a, 100b is disrupted.

Electrical power is provided to the steer-by-wire system 100a, 100b by way of two batteries (not shown), each independently energizing the steer-by-wire system 100a, 100b at 50 and 52. The reason for the redundancy of two batteries is that in the event that one battery is inoperative, the operation of the other battery is not affected.

Continuing in FIGS. 1 and 2, the first control area network, CAN1 10, and the second control area network, CAN2 12, transmit and carry signals to and from a plurality of controllers 14, 18, 16, 20. A left controller A 14 and a right controller A 16 are dedicated to CAN1 10, and a left controller B 18 and a right controller B 20 are dedicated to CAN2 12. In cases where both CAN1 10 and CAN2 12 are inoperative, or if the master controller 22 is inoperative, the third network, backup CAN 24, will transmit steering wheel position signals to the local controllers 14, 16, 18, 20 to allow steering of the road wheels 32, 40. If only one control area network is inoperative, then the two local controllers connected to that control area network are removed from service, and the vehicle continues to steer using the remaining two controllers. The motors and controllers in the operative control area network will therefore preferably be powerful enough to steer the vehicle alone. It will be appreciated that the CAN1 10 and CAN2 12 may be configured in such a manner that the backup CAN 24 will be operative when both CAN1 10 and CAN2 12 become inoperative or when either CAN1 10 or CAN2 12 become inoperative. In formation provided by the backup CAN 24 is always available though it operates only when needed.

A set of left sensors 26 sense the position of left road wheel 32 and provide as output a set of signals that include position signals 28 and 30. Position signal 28 is fed into the left controller A 14 and position signal 30 is fed into the left controller B 18.

In a similar fashion, a set of right sensors 34 sense the position of the right road wheel 40 and provide as output a set of signals that include position signals 36 and 38. The position signal 36 is fed into the right controller A 16 and position signal 38 is fed into the right controller B 20.

The left controller A 14 and left controller B 18 independently control left motor one, 42 and left motor two, 44 respectively. The control is accomplished independently via motor drives 46 and 48 respectively. The first battery and the second battery each independently energize the above independent controllers 14, 18 at 50 and 52. In other words, the first battery, independent of the second battery, energizes left controller A 14 at 50. Similarly, the second battery, independent of the first battery, energizes left controller B 18 at 52. The independence is further enhanced by way of having left controller A 14 independently coupled to CAN1 10, whereas left controller B 18, independent of left controller A 14, is coupled to CAN2 12.

Similarly, the right controller A 16 and right controller B 20 independently control right motor one, 54 and right motor two, 56 respectively. The control is accomplished independently via motor drives 58 and 60 respectively. The first battery, and second battery each independently energize the above independent controllers 16, 20 at 50 and 52. In other words, the first battery, independent of the second battery 52, energizes right controller A 16 at 50. Similarly, the second battery, independent of the first battery 50, energizes right controller B 20 at 52. The independence is further enhanced by way of having right controller A 16 independently coupled to CAN1 10, whereas right controller B 20, independent of right controller A 16, is coupled to CAN2 12.

The master controller 22 is coupled to CAN1 10 and CAN2 12, as well as being energized by the first battery, and the second battery at 50 and 52. Additionally, the master controller 22 is coupled to a computer or central processing unit (not shown) via a data bus 62. Furthermore, the set of left sensors 26 sense a first force or torque that is derived from the left road wheel 32. A first force or torque signal 64 is fed into the master controller 22. Similarly, the set of right sensors 34 sense a second force or torque that is derived from the right road wheel 40. A second force or torque signal 66 is fed into the master controller 22.

The handwheel actuator controller 68 is coupled to the steering wheel 74 through the steering assembly 110 and is connected to CAN1 10, and CAN2 12. In addition, the handwheel actuator 68 is powered by the first battery and the second battery at 50 and 52. The handwheel actuator 68 is also coupled to the torque motor 70 at motor drive 96, which in turn is coupled to a set of steering wheel sensors 72.

The set of sensors 72 is coupled to the handwheel actuator controller 68 at 94. The set of steering wheel sensors 72 sensing information from the steering wheel 74 is coupled to the backup CAN 24, whereby the sensed information from the steering wheel 74 can be communicated to the local controllers 14, 18, 16, 20. The backup CAN 24 is energized by the first battery at 50 and the second battery at 52.

The master controller 22 includes a set of master fault status lines 76, 78, 80, 82 that communicate the status of the master controller 22 to local controllers 14, 18, 16, 20, thereby causing the local controllers 14, 18, 16, 20 to use data from the backup CAN 24. The local controllers 14, 18, 16, 20 are preferably always communicating with the backup CAN 24, not just during faults, so there is no increase in bus traffic during faults. This keeps the communications predictable under fault conditions.

The master controller 22 includes a pulse width modulation (PWM) brake link 84 that can generate a command to cause the vehicle to stop. The master controller 22 also has a one Hertz (Hz) timing input command, which functions as a set point command for the master controller 22.

Figure 3:
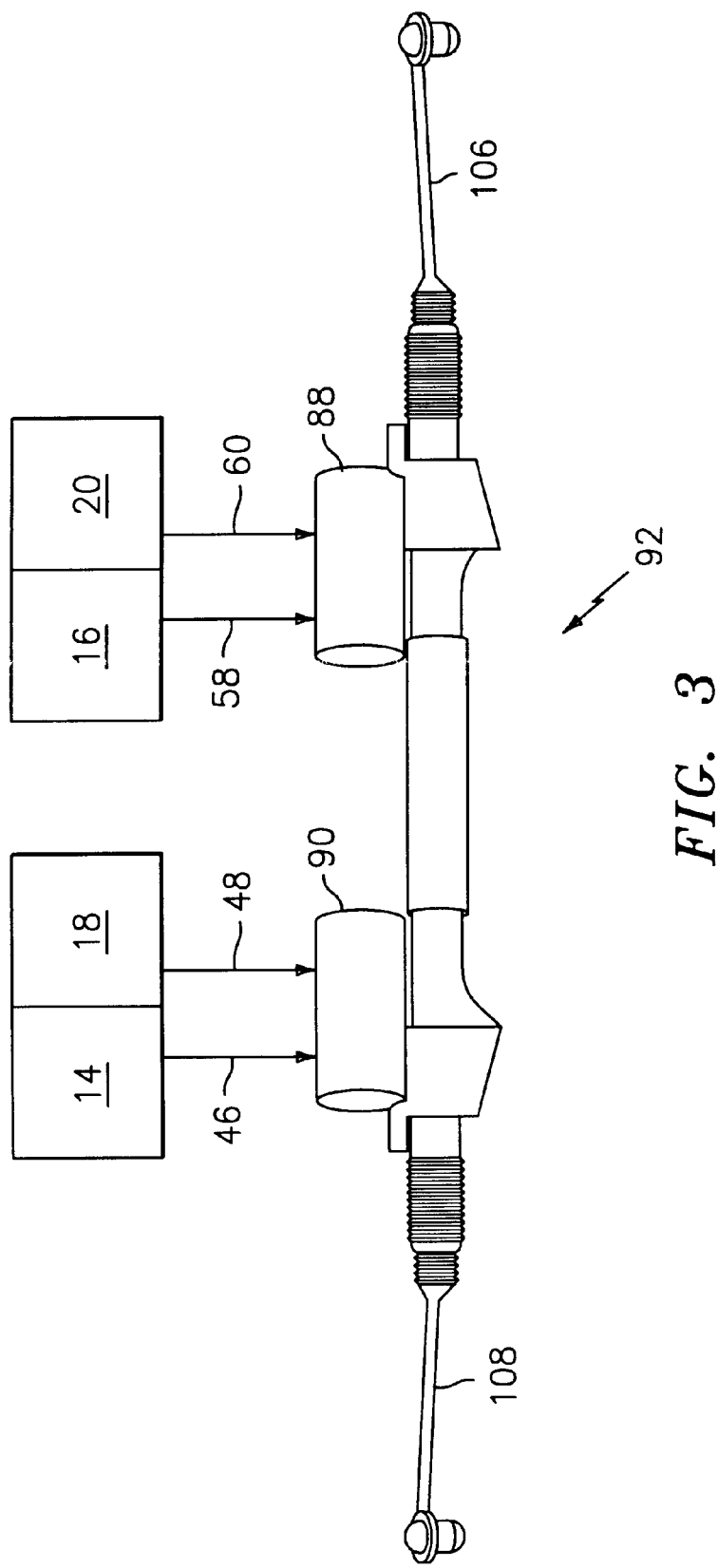
FIG. 3 is a depiction of an embodiment of the automotive steer-by-wire system of FIG. 1 and FIG. 2.

Referring to FIG. 3, one embodiment of the automotive steer-by-wire system 100a, 100b of FIGS. 1 and 2 is depicted. The aforesaid embodiment includes a right motor assembly 88 having a driving mechanism (not shown) coupled to a driving system 92. For example, a rotor (not shown) of the right motor assembly 88 may link with an adjustable rotating member, such as a tie rod, of the driving system 92. The right controller A 16 and the right controller B 20, via their respective motor drives 58 60, activate the right motor assembly 88. Upon inspection of FIG. 3, it will also be seen that only one motor casing is on the right side of the driving system 92. However, the inner wiring of the right motor assembly 88 can contain two independent sets of stator wirings for right motor one 54 and right motor two 56.

In a similar fashion, the aforesaid embodiment of the automotive steer-by-wire system 100a, 100b of FIGS. 1 and 2 includes a left motor assembly 90 having a driving mechanism (not shown) coupled to the driving system 92. For example, a rotor (not shown) of the left motor assembly 90 may link with an adjustable rotating member such as a tie rod. The left controller A 14 and the left controller B 18, via their respective motor drives 46 48, activate the left motor assembly 90. Upon inspection of FIG. 3, it will be seen that only one motor casing is on the left side of the driving system 92. However, the inner wiring of the left motor assembly 90 can contain two independent sets of stator wiring for left motor one 42 and left motor two 44.

Alternatively it will be appreciated that the automotive steer-by-wire system 100a, 100b of FIGS. 1 and 2 may embody only one casing for both the right side and the left side with a set of four or more wirings that are independent of each other. The wirings thereof are independently controlled by their respective controllers, e.g., by the controllers such as the left controller A 14 and the right controller A 16, as well as the left controller B 18 and the right controller B 20.

Other "by-wire" systems, commonly known as X-by-wire systems may be included within the scope of the steer-by-wire system described herein. For example, some brake-by-wire systems may suitably implement the apparatus and methods described herein. Furthermore, the steer-by-wire system 100a, 100b is unique in that no mechanical linkages exist between, for example, a vehicle operator holding the steering wheel 74 and the road wheels 32, 40. However, in a conventional steering system, such as an electric power steering system, an electric motor assists the mechanical linkage and if the electric motor becomes inoperative, the steering system may still function by relying upon the mechanical link between the steering wheel and the road wheels.

An automotive steer-by-wire system has been described that includes a first network. The first network connects a first set of controllers for controlling a first set of motors. The steer-by-wire system further includes a second network that is independent of the first network and connects a second set of controllers for controlling a second set of motors. The steer-by-wire system includes a third network that is independent of the first network and the second network and connects the first set of controllers and the second set of controllers for controlling the first and second set of motors if the first and second network are inoperative. Information is transmitted via the third network independent of the first network and the second network.

From the foregoing description an automotive steer-by-wire system has been disclosed that increases vehicle component packaging flexibility and reduces vehicle assembly time. Furthermore, the steer-by-wire system decreases vehicle development time, reduces vehicle fuel consumption, eliminates the need for hydraulic fluids and is symmetric with respect to the vehicle. Still further, the steer-by-wire system decouples kinematic and torque/force relationships for greater system performance, tuning and flexibility in steering ratio and effort.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. An automotive steer-by-wire system comprising:
   a distributed control system including:
   a master controller responsive to the torque acting upon a set of road wheels;
   a first local controller in signal communication with the master controller and responsive thereto for driving a first motor coupled to a first road wheel thereby steering the first road wheel; and
   a second local controller in signal communication with the master controller and responsive thereto for driving a second motor coupled to a second road wheel thereby steering the second road wheel;
   a third local controller, independent of the first and second local controllers, in signal communication with the master controller for driving a third motor coupled to the first road wheel thereby steering the first road wheel;
   a fourth local controller, independent of the first and second local controllers, in signal communication with the master controller for driving a fourth motor coupled to the second road wheel thereby steering the second road wheel; and
   a backup controller in signal communication with the first, second, third and fourth local controllers;
   wherein the backup controller is operative to drive the first, second, third and fourth motors if the first, second, third and fourth local controllers become inoperative or the master controller becomes inoperative.

2. The automotive steer-by-wire system as set forth in claim 1 further comprising a steering assembly in signal communication with the master controller for directing the position of the first and second road wheels.

3. The automotive steer-by-wire system as set forth in claim 1 further comprising:
   a first position sensor in signal communication with the first local controller for sensing the position of the first road wheel; and
   a second position sensor in signal communication with the second local controller for sensing the position of the second road wheel.

4. The automotive steer-by-wire system as set forth in claim 1 further comprising:
   a first force sensor in signal communication with the master controller for sensing the force acting upon the first road wheel; and
   a second force sensor in signal communication with the master controller for sensing the force acting upon the second road wheel.

5. The automotive steer-by-wire system as set forth in claim 2 wherein the steering assembly includes:
   a handwheel actuator controller in signal communication with the master controller and responsive thereto;
   a steering sensor coupled to a steering wheel and in signal communication with the master controller and the handwheel actuator controller for sensing the position of the steering wheel; and
   a torque motor coupled to the handwheel actuator controller and to the steering sensor for generating feedback torque to the steering wheel wherein the feedback torque simulates torques acting upon the first and second road wheel.

6. The automotive steer-by-wire system as set forth in claim 1 further comprising;
   a third position sensor in signal communication with the third local controller for sensing the position of the first road wheel; and
   a fourth position Sensor in signal communication with the fourth local controller for sensing the position of the second road wheel.

7. The automotive steer-by-wire system as set forth in claim 1 further comprising:
   a third force sensor in signal communication with the master controller for sensing the force acting upon the first road wheel; and
   a fourth force sensor in signal communication with the master controller for sensing the force acting upon the second road wheel.

8. An automotive steer-by-wire system comprising:
   a distributed control system including:

a master controller responsive to the torque acting upon a set of road wheels;

a master controller responsive to the torque acting upon a set of roadwheel;

a first control area network including a first local controller in signal communication with the master controller and responsive thereto for driving a first motor coupled to a first road wheel thereby steering the first road wheel; and a second local controller in signal communication with the master controller and responsive thereto for driving a second motor coupled to a second road wheel thereby steering the second road wheel;

a second control area network independent of the first control area network including a third local controller in signal communication with the master controller and responsive thereto for driving a third motor coupled to the first road wheel thereby steering the first road wheel; and a fourth local controller in signal communication with the master controller for driving a fourth motor coupled to the second road wheel thereby steering the second road wheel;

a backup control area network in signal communication with the first, second, third and fourth local controllers;

wherein the backup control area network is operative to drive the first, second, third and fourth motors if the first and second control area networks become inoperative or the master controller becomes inoperative.

9. The automotive steer-by-wire system as set forth in claim 8 further comprising a steering assembly in signal communication with the master controller for directing the position of the first and second steering gear systems.

10. The automotive steer-by-wire system as set forth in claim 8 wherein the first steering gear system includes:

a first motor in signal communication with the first local controller;

a first linkage system connected to the first motor and a first road wheel;

a first position sensor in signal communication with the first local controller for sensing the position of the first linkage system; and a first force sensor in signal communication with the master controller for sensing the force acting upon the first linkage system.

11. The automotive steer-by-wire system as set forth in claim 8 wherein the second steering gear system includes:

a second motor in signal communication with the second local controller;

a second linkage system connected to the second motor and a second road wheel;

a second position sensor in signal communication with the second local controller for sensing the position of the second linkage system; and a second force sensor in signal communication with the master controller for sensing the force acting upon the second linkage system.

12. The automotive steer-by-wire system as set forth in claim 9 wherein the steering assembly includes:

a handwheel actuator controller in signal communication with the master controller and responsive thereto;

a steering sensor coupled to a steering wheel and in signal communication with the master controller and the handwheel actuator controller for sensing the position of the steering wheel; and a torque motor coupled to the handwheel actuator controller and to the steering sensor for generating feedback torque to the steering wheel wherein the feedback torque simulates torques acting upon the first and second steering gear systems.

13. The automotive steer-by-wire system as set forth in claim 8 wherein the first steering gear system further includes:

a third position sensor in signal communication with the third local controller for sensing the position or the first steering gear system; and a third force sensor in signal communication with the master controller for sensing the force acting upon the first steering gear system.

14. The automotive steer-by-wire system as set forth in claim 8 wherein the second steering gear system further includes:

a forth position sensor in signal communication with the fourth local controller for sensing the position of the second steering gear system; and a fourth force sensor in signal communication with the master controller for sensing the force acting upon the second steering gear system.

15. An automotive steer-by-wire system comprising:

a master controller responsive to the torque acting upon a set of roadwheel;

a first control area network including a first local controller in signal communication with the master controller and responsive thereto for driving a first motor coupled to a first road wheel thereby steering the first road wheel; and a second local controller in signal communication with the master controller and responsive thereto for driving a second motor coupled to a second road wheel thereby steering the second road wheel;

a second control area network independent of the first control area network including a third local controller in signal communication with the master controller and responsive thereto for driving a third motor coupled to the first road wheel thereby steering the first road wheel; and a fourth local controller in signal communication with the master controller for driving a fourth motor coupled to the second road wheel thereby steering the second road wheel;

a backup control area network in signal communication with the first, second, third and fourth local controllers;

wherein the backup control area network is operative to drive the first, second, third and fourth motors if the first and second control area networks become inoperative or the master controller becomes inoperative.

16. The automotive steer-by-wire system as set forth in claim 15 further comprising a steering assembly in signal communication with the master controller for directing the position of the first and second road wheels.

17. The automotive steer-by-wire system as set forth in claim 15 further comprising:

a first position sensor in signal communication with the first local controller for sensing the position of the first road wheel; and a second position sensor in signal communication with the second local controller for sensing the position of the second road wheel.

18. The automotive steer-by-wire system as set forth in claim 15 further comprising:
a first force sensor in signal communication with the master controller for sensing the force acting upon the first road wheel; and
a second force sensor in signal communication with the master controller for sensing the force acting upon the second road wheel.

19. The automotive steer-by-wire system as set forth in claim 16 wherein the steering assembly includes:
a handwheel actuator controller in signal communication with the master controller and responsive thereto;
a steering sensor coupled to a steering wheel and in signal communication with the master controller and the handwheel actuator controller for sensing the position of the steering wheel; and
a torque motor coupled to the handwheel actuator controller and to the steering sensor for generating feedback torque to the steering wheel wherein the feedback torque simulates torques acting upon the first and second road wheel.

20. The automotive steer-by-wire system as set forth in claim 15 further comprising:
a third position sensor in signal communication with the third local controller for sensing the position of the first road wheel; and
a fourth position sensor in signal communication with the forth local controller for sensing the position of the second road wheel.

21. The automotive steer-by-wire system as set forth in claim 15 further comprising:
a third force sensor in signal communication with the master controller for sensing the force acting upon the first road wheel; and
a fourth force sensor in signal communication with the master controller for sensing the force acting upon the second road wheel.

22. An automotive steer-by-wire system comprising:
a distributed control system including:
a master controller responsive to the torque acting upon a set of road wheels;
a first control area network interconnecting a first set of controllers for controlling a first set of motors;
a second control area network interconnecting a second set of controllers for independently controlling a second set of motors; and
a backup control area network interconnecting the first set of controllers and the second set of controllers for independently controlling the first and second sets of motors;
wherein the backup control area network is operative to control the first and second set of motors if the first and second control area networks become inoperative or the master controller becomes inoperative.

23. The automotive steer-by-wire system as set forth in claim 22 wherein the first control area network includes:
a first local controller in signal communication with the master controller and responsive thereto for driving a first motor coupled to a first road wheel thereby steering the first road wheel; and
a second local controller in signal communication with the master controller and responsive thereto for driving a second motor coupled to a second road wheel thereby steering the second road wheel.

24. The automotive steer-by-wire system as set forth in claim 23 further comprising a steering assembly in signal communication with the master controller for directing the position of the first and second road wheels.

25. The automotive steer-by-wire system as set forth in claim 23 further comprising:
a first position sensor in signal communication with the first local controller for sensing the position of the first road wheel; and
a second position sensor in signal communication with the second local controller for sensing the position of the second road wheel.

26. The automotive steer-by-wire system as set forth in claim 23 further comprising:
a first force sensor in signal communication with the master controller for sensing the force acting upon the first road wheel; and
a second force sensor in signal communication with the master controller for sensing the force acting upon the second road wheel.

27. The automotive steer-by-wire system as set forth in claim 24 wherein the steering assembly includes:
a handwheel actuator controller in signal communication with the master controller and responsive thereto;
a steering sensor coupled to a steering wheel and in signal communication with the master controller and the handwheel actuator controller for sensing the position of the steering wheel; and
a torque motor coupled to the handwheel actuator controller and to the steering sensor for generating feedback torque to the steering wheel wherein the feedback torque simulates torques acting upon the first and second road wheel.

28. The automotive steer-by-wire system as set forth in claim 22 wherein the second control area network includes:
a third local controller in signal communication with the master controller and responsive thereto for driving a third motor coupled to the first road wheel thereby steering the first road wheel; and
a fourth local controller in signal communication with the master controller and responsive thereto for driving a fourth motor coupled to the second road wheel thereby steering the second road wheel.

29. The automotive steer-by-wire system as set forth in claim 28 further comprising:
a third position sensor in signal communication with the third local controller for sensing the position of the first road wheel; and
a fourth position sensor in signal communication with the fourth local controller for sensing the position of the second road wheel.

30. The automotive steer-by-wire system as set forth in claim 28 further comprising:
a third force sensor in signal communication with the master controller for sensing the force acting upon the first road wheel; and
a fourth force sensor in signal communication with the master controller for sensing the force acting upon the second road wheel.

31. The automotive steer-by-wire system as set forth in claim 22 wherein the backup control area network includes a backup controller in signal communication with the first, second, third and fourth local controllers and the steering sensor for conveying the position of the steering wheel to the first, second, third and fourth local controllers allowing thereby the steering of the first and second road wheels.

* * * * *